Apr. 3, 1923. 1,450,357
E. W. CURTIS
CROSSCUT SAWING MACHINE
Filed July. 1, 1920 3 sheets-sheet 3

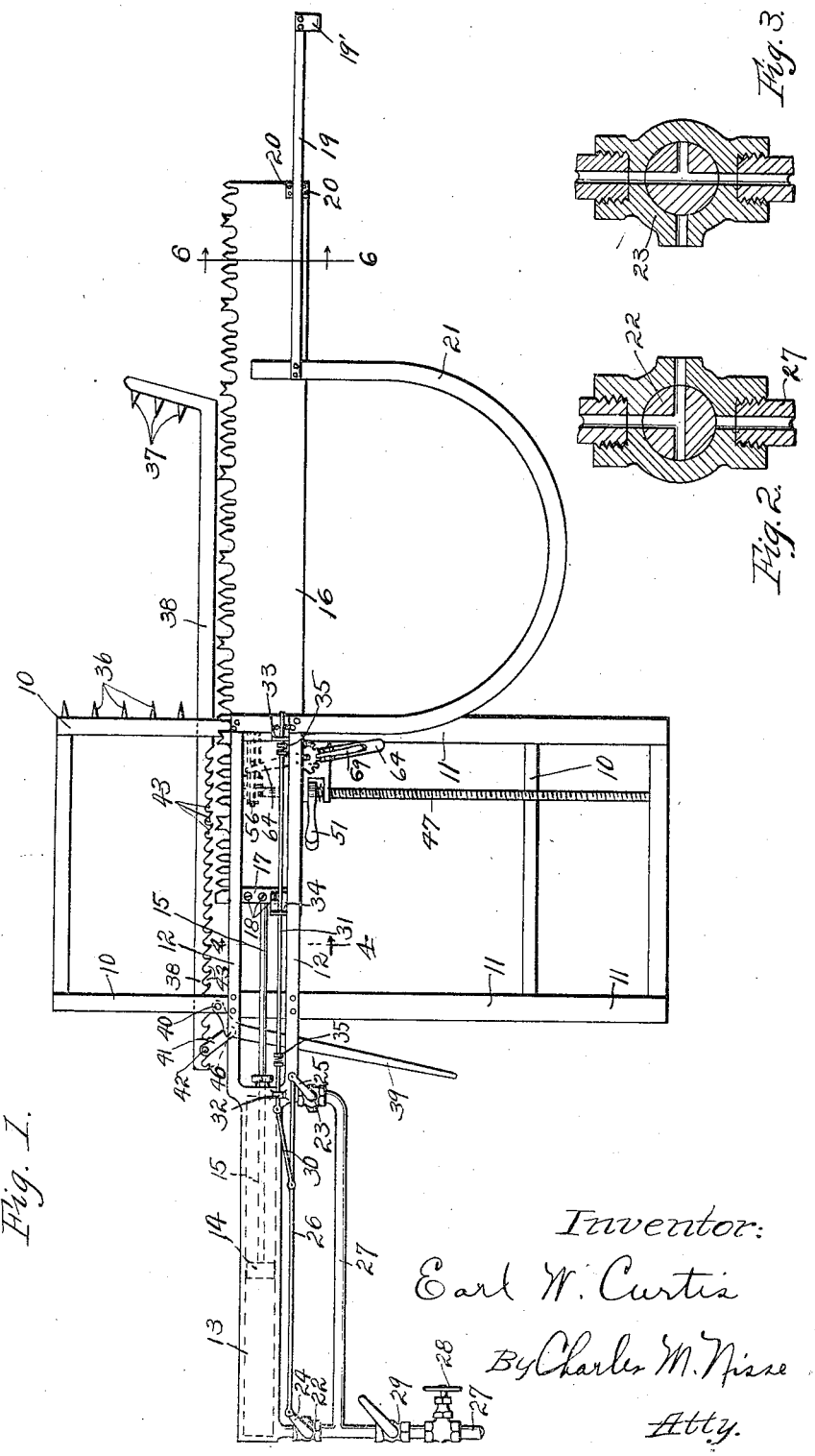

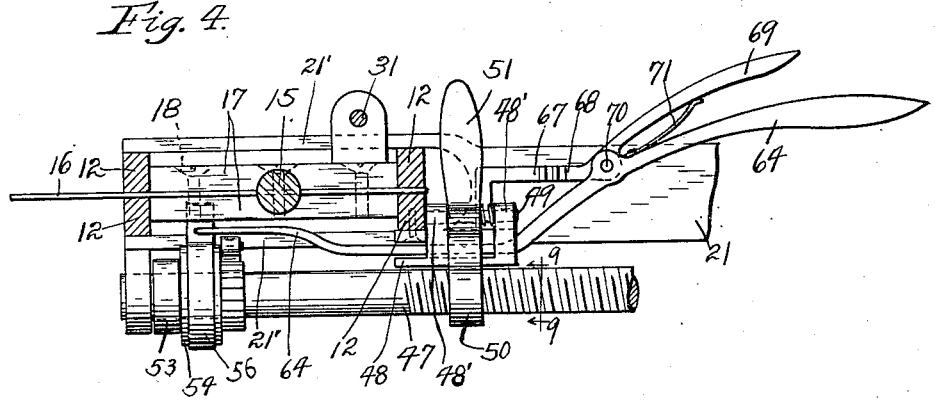
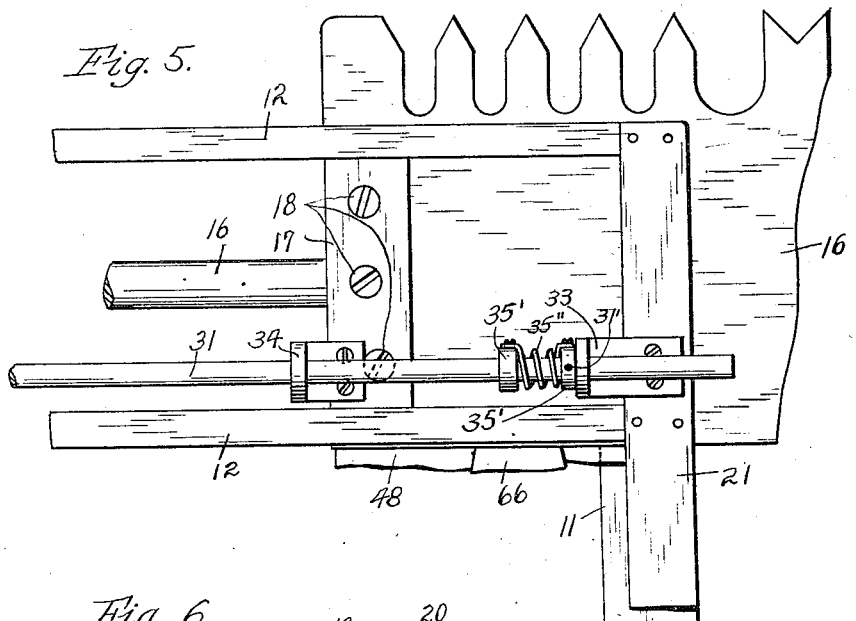
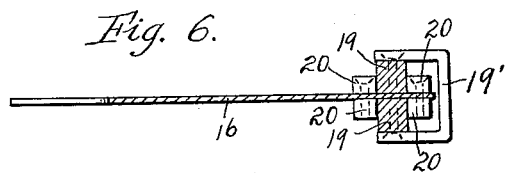

Inventor:
Earl W. Curtis
By Charles M. Nisse
Atty.

Patented Apr. 3, 1923.

1,450,357

UNITED STATES PATENT OFFICE.

EARL W. CURTIS, OF FORT MADISON, IOWA.

CROSSCUT SAWING MACHINE.

Application filed July 1, 1920. Serial No. 393,275.

*To all whom it may concern:*

Be it known that I, EARL W. CURTIS, a citizen of the United States, residing at Fort Madison, in the county of Lee and State of Iowa, have invented certain new and useful Improvements in Crosscut Sawing Machines, of which the following is a specification.

My invention relates to sawing machines, and particularly to this class of machines adapted for felling trees and sawing them up.

One of the objects of my invention is the provision of a simple and efficient air driven cross-cut saw of the character mentioned.

Another object is the provision of a portable air driven saw which will be light, strong and easily manipulated by one operator.

A further object is the provision of a cross-cut saw, power driven, with guides for supporting both ends of the saw.

A still further object is the provision of a simple and efficient power driven saw having means for gaging the feeding of the saw into the timber.

Other objects will appear hereinafter.

An embodiment of my invention is illustrated in the accompanying drawings, forming a part of this specification, and in which—

Fig. 1 is a plan view of a cross-cut saw embodying my invention;

Figs. 2 and 3 are enlarged sections of valves used in the construction;

Fig. 4 is an enlarged section taken on line 4—4 of Fig. 1;

Fig. 5 is a fragmental plan view of some of the parts shown in Fig. 4 and showing the saw near one terminal of its movement;

Fig. 6 is an enlarged section taken on line 6—6 of Fig. 1;

Figure 7:
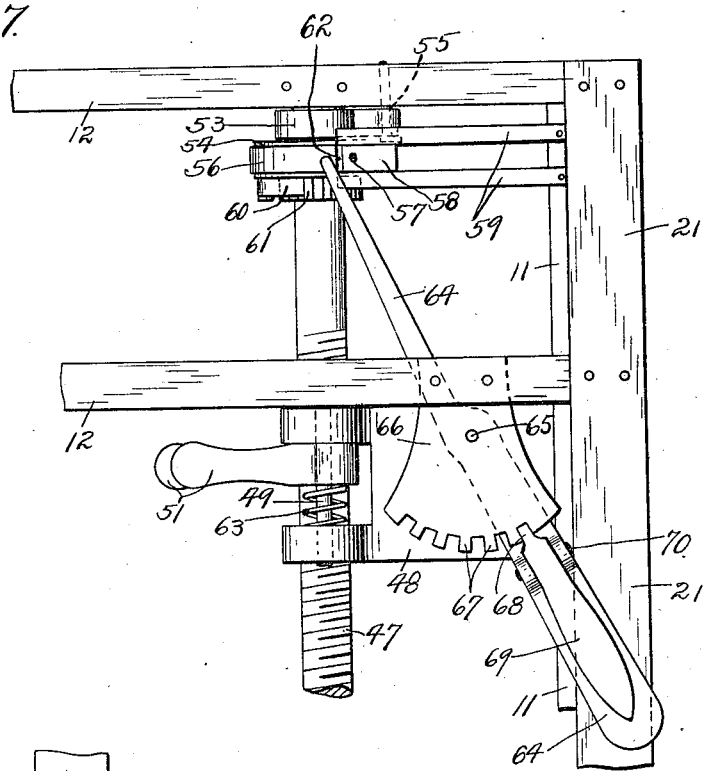
Fig. 7 is a view similar to Fig. 5, but showing the saw removed to expose underlying parts.

Referring more particularly to the drawings, I have indicated a frame 10, rectangular in form, and providing guideways and supporting means for the rest of the device. On the frame 10 I provide a carriage 11 adapted to slide longitudinally of the frame 10. Disposed on the carriage 11 are two frame members 12 forming a saw guide. At one end of the frame 12 I provide a cylinder 13 in which is mounted a piston 14. The piston 14 has a piston rod 15 extending out through the end of cylinder 13 and between guides 12 for attachment to the saw 16. The saw may be secured in any desirable manner. I have provided two blocks 17, which with the screws 18, secure the piston rod 15 to the blocks 17, and the saw 16 to said blocks. The guides 12 are each preferably made up of two members, as clearly indicated in Fig. 4, with the saw 16 disposed between the upper and lower bars 12 at each side of the saw guide. The blocks 17 are preferably of a length equal to the distance between the bars 12—12 so that they bear against the bars 12. At the other end of the saw I provide guide bars 19, one above and the other below the saw, as clearly indicated in Fig. 6. This end of the saw is provided with two blocks 20, each at the top and bottom to bear against the bars 19, providing a guide for this end of the saw. The bars 19 are joined with the bars 12 by means of a curved member 21. In Fig. 4 I have indicated member 21 as being a single bar bifurcated with the parts 21' at one end secured to the bars 12, but the member 21 may be made in any desirable manner.

The piston 14 is operated preferably by air, but may be operated by any desirable working fluid. I have indicated a valve 22 at one end, and a valve 23 at the other end of cylinder 13 for controlling the admission of the working fluid. The valves have arms 24 and 25 for controlling them, and these arms are connected together by a link 26. A supply pipe 27 leads from any suitable source of working fluid to the valves 22 and 23. I preferably provide two valves 28 and 29 in pipe 27 to control the supply of working fluid to the valves 22 and 23. One of the valves 28 and 29 is preferably set to cause the saw to operate at a desired speed, and the other valve 28 and 29 used to stop and start the saw. It will thus be seen by having two valves that one can quickly stop the saw and start it again without interfering with the speed at which it is desired to operate the saw. However, one of these valves may be dispensed with when so desired. The link 26 is connected by means of a link 30 with a rod 31 which is journaled in bearings 32 and 33 and adapted for longitudinal movements. One of the blocks 17 has an upstanding member 34 thereon having a perforation engaging the rod 31 so that as the saw moves back and forth member 34 slides on rod 31. Near the ends of rod 31 I provide bumping members 35 so that as the saw reaches one terminal of its movement member 34 engages one of the bumpers 35 to change the valves 22 and 23, thereby causing one of these valves to exhaust the cylinder and the other to furnish working fluid to the latter. In Fig. 1 the saw is shown as traveling toward the lefthand of the figure and when it moves sufficiently far for member 34 to engage the bumper 35 valve arms 24 and 25 will be moved to the other terminals of their movement, thereby changing the valves 22 and 23 from their positions indicated in Figs. 2 and 3. In Figs. 2 and 3 these valves are shown as the parts located in Fig. 1.

Figure 8:
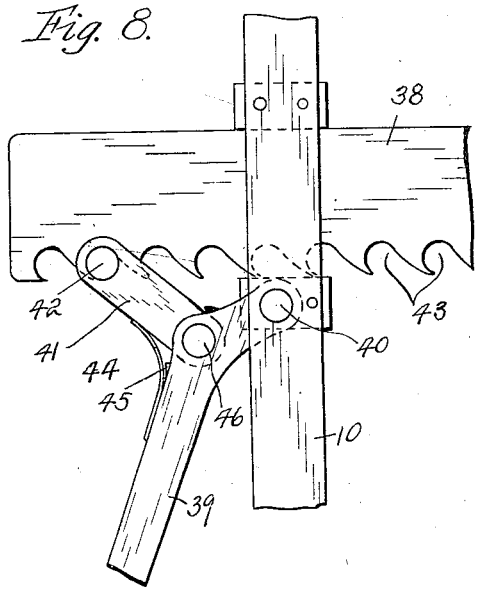
Fig. 8 is a fragmental enlarged plan view of a portion showing the log clamping operating means.
Figure 9:
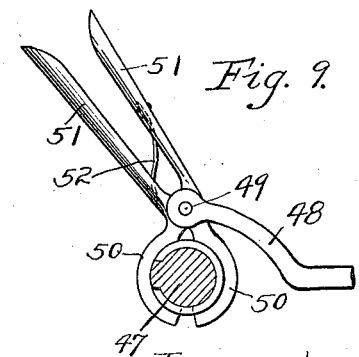
Fig. 9 is a section taken as on line 9—9 in Fig. 4 showing a split nut and handle used in the construction.

When the saw is adjusted to a tree or a log to be sawed points 36 on frame 10 are placed against the log and points 37 on a bar 38 are placed against the other side of the log or tree. Then lever 39 which is pivoted as at 40 to one side of frame 10 is operated to draw the points 36 and 37 into the log to secure the frame 10 in position. The lever 39 is connected by means of a link 41 with a roller 42 which is adapted to engage notches 43 in one side of bar 38 so that as lever 39 is moved back and forth the roller 42 will engage notches 43 to pull the bar 38 longitudinally to lock the points in the log. In Fig. 8 I have indicated a spring 44 to normally press the roller 42 toward the notches 43. When it is desired to lock the device, lever 39 is pressed away from frame 10 until a shoulder 45 engages link 41. At this time the pivotal point 46 between the lever 39 and link 41 will have passed a line between points 40 and the axis of roller 42, thereby locking bar 38 until released by the lever 39.

The carriage 11 is moved along on frame 10 by means of a screw rod 47 journaled in carriage 11. Secured to frame 10 is a plate 48 having upstanding bearings 48' with a pin 49 mounted therein, and on this pin is pivoted a nut 50. The nut 50 is made up of two members having handles 51 with a spring 52 between the handles for normally holding the jaws of the nut 50 in engagement with the screw rod 47. When it is desired to start the saw the operator moves the handles 51 toward each other to free the nut 50 from rod 47, then manually moves carriage 11 along on frame 10 until the teeth of saw 16 engage the tree or log to be sawed. When the saw is brought to proper position the operator releases handles 51 permitting the spring to close the nut 50 on rod 47.

The carriage 11 is then automatically moved along to feed the saw 16 into the timber. I have shown a means for doing this comprising a clock-spring 53 secured to the hub of a wheel 54 with the other end of said spring attached to one of bars 12 as at 55. The wheel 54 is loosely mounted on rod 47 and wound on said wheel is a belt 56 which has one end secured as at 57 to a sliding member 58 mounted in guides 59. The wheel 54 has a pawl 60 pivoted thereto and the pawl engages the teeth of a ratchet wheel 61 which is fixed on rod 47. With this arrangement, when block 17 moves away from cylinder 13 and nears the other end of its movement, it engages an upstanding end 62 of sliding member 58 and pulls the latter along guide 59. This movement winds up spring 53, at the same time engaging pawl 60 in teeth of ratchet wheel 61, causing rod 47 to rotate in nut 50 which pulls the carriage 11 along the frame 10. When the block 17 moves back in its other direction, spring 53 causes the wheel 54 to rotate on rod 47. By means of buffer spring 63 an even feed is effected.

The length of the stroke of member 58 and consequently the speed with which the saw is fed into the timber may be controlled in any desirable manner. I have indicated a lever 64 pivoted as at 65 to a member 66 secured to one of bars 12. One end of lever 64 is in the path of the upstanding end 62 of sliding member 58 so as to stop this sliding member at desirable points from the adjacent part of carriage 11. The member 66 has a segmental gear 67 thereon adapted for engagement by a tooth 68 on a lever 69. The latter is pivoted as at 70 to lever 64 and is adapted to hold the lever 64 in desired positions. By pressing down on lever 69 the tooth 68 is raised out of the teeth of segmental gear 67 when the lever 64 can be moved on its pivot point with its end adjacent member 58 set so as to stop the member 58 against the action of spring 53. Each time, however, the block 17 comes in this direction it will move sliding member 58 from where it engages the latter to the end of its stroke, and the amount of travel of sliding member 58 and consequently the speed with which the saw is fed into the log will be controlled by the position of lever 64. A spring 71 is preferably provided between levers 69 and 64 to normally hold the tooth 68 in one of the teeth of segmental gear 67.

It will be apparent that this sawing machine may be utilized for cutting trees, logs, or sawing ice, metal or other materials, which is to be sawed.

I preferably make the bumping members 35 resilient so as to ease the shock from member 34 engaging said bumpers. These may be formed in any desirable manner, that indicated being made up of two collars 35' with a spring 35" between the collars. One collar is left loose on rod 31 and the other collar secured rigidly thereto, as indicated at 31'.

I claim:—

1. In combination, a track; a carriage mounted on the track; a screw shaft mounted on the carriage and having threaded connection with the track; a ratchet wheel on the screw shaft; a reciprocatory member mounted on the carriage; a rotary member journaled on the screw shaft; a strap wound on the rotary member and connected with said reciprocatory member; a pawl engaging the ratchet wheel and mounted on the rotary member; a spring connected with the rotary member; and an adjustable stop in the path of the reciprocatory member.

2. In combination, a track; a carriage mounted on the track; a screw mounted on the carriage and having threaded connection with the track; a ratchet wheel fixed on said screw; a pawl in operative engagement with the ratchet wheel; a spring operatively connected with the pawl; a movable saw-operating member; a reciprocatory member in the path of the saw-operating member and operatively connected with the pawl; and means limiting the movement of said reciprocatory member to shorten the movement of the latter so that it travels a shorter distance than the saw-operating member.

3. In combination, a track; a carriage mounted on the track; a screw mounted on the carriage and having threaded connection with the track; a ratchet wheel fixed on said screw; a pawl in operative engagement with the ratchet wheel; a spring operatively connected with the pawl; a movable saw-operating member; a reciprocatory member in the path of the saw-operating member and operatively connected with the pawl; a movable stop; and manual means for setting said stop at defferent positions in the path of the reciprocatory member.

4. In combination, a track; a carriage mounted on the track; a ratchet and pawl gearing connected between the track and carriage; a spring connected with the pawl for moving it in one direction; a sliding member operatively connected to the pawl for moving it in the other direction; a saw-operating member mounted for movement into the path of said sliding member; and a lever extending in the path of said sliding member for limiting the movement of the latter in one direction.

5. In combination, a track; a carriage mounted on the track; a ratchet and pawl gearing connected between the track and carriage; a spring connected with the pawl for moving it in one direction; a sliding member operatively connected to the pawl for moving it in the other direction; a saw-operating member mounted for movement into the path of said sliding member; a lever extending in the path of said sliding member for limiting the movement of the latter in one direction; and means for setting said lever in different positions to vary the movements of said sliding member.

6. In combination, a track; a carriage mounted on the track; a saw mounted for reciprocal movements on the carriage; a member slidable on the carriage; a screw shaft mounted on the carriage; a ratchet wheel fixed on the shaft; a belt wheel loosely mounted on the shaft; a belt connecting the belt wheel with said slidable member; a pawl on the belt wheel engaging said ratchet wheel; a spring connected with the belt wheel and carriage, adapted to rotate the belt wheel in one direction; means on said slidable member adapted to be engaged by the saw for moving the belt wheel in the other direction; and a connection between the screw shaft and track.

7. In combination, a track; a carriage mounted on the track; a saw mounted for reciprocal movements on the carriage; a screw shaft; a ratchet wheel fixed on the shaft; a spring connected with said ratchet wheel and adapted to rotate said ratchet wheel in one direction; means associated with the saw and said spring for transmitting force from the saw to wind up said spring; a split nut mounted on the track and engaging the screw shaft; and an adjustable stop associated with said spring for controlling the movement of said ratchet wheel by said spring.

8. In combination, a track; a carriage mounted on the track; a saw mounted on the carriage for movement in a different direction than the movement of the carriage on said track; a screw mounted on said carriage; a nut on said screw; and a buffer spring between said track and said nut.

In testimony whereof I have signed my name to this specification on this 28th day of June, A. D. 1920.

EARL W. CURTIS.